2,972,640

CYCLOOLEFIN PRODUCTION UTILIZING ISOBUTYLENE OR ITS DIMERIZATION PRODUCT AS CATALYST ACTIVATOR

Robert E. Burks, Jr., Birmingham, Ala., and Antonio A. Sekul, Jackson, Miss., assignors, by mesne assignments, to Cities Service Research and Development Company, New York, N.Y., a corporation of New Jersey No Drawing. Filed Apr. 27, 1959, Ser. No. 808,930

9 Claims. (Cl. 260—666)

This invention relates to methods of preparing cycloolefins, in particular, 1,5-cyclooctadiene and substituted 1,5-cyclooctadienes.

The prior art shows the production of cycloolefins from conjugated open chain diolefinic compounds using a catalyst derived from nickel carbonyl by the replacement of one or two of the CO groups thereof with an organic phosphite or phosphine. These processes require an impractical and long period of time for reaction. In one prior disclosure, the process illustratively requires 28 hours in one instance and four days in another. Manifestly this hold-up time is uneconomic and undesirable. Shortening the time for reaction of prior art processes results in an unsatisfactory yield and proportion of conversion of starting materials. Another problem encountered is control of the reaction to yield a relatively high proportion of the desired cycloolefin, and to inhibit side reactions.

In accordance with the present invention a much briefer reaction time is possible and side reactions are inhibited when utilizing particular activators along with the catalyst.

It is an object of this invention to prepare cycloolefinic compounds.

It is a further object of this invention to prepare an activator and catalyst mixture providing rapid catalysis of conjugated diolefinic compounds to cycloolefinic compounds.

Another object of this invention is to provide a process of activating nickel carbonyl catalysts and catalytic derivatives thereof with isobutylene and/or the dimerization product thereof, hereinafter called diisobutylene.

Further objects will be apparent, to those skilled in the art, from a consideration of the following description.

The starting material for this invention is a conjugated open chain diolefin, preferably 1,3-butadiene. Other conjugated open chain diolefins, particularly 1,3-diolefins, and including 2-methyl-1,3-butadiene (isoprene); 2,3-dimethyl-1,3-butadiene; 2-chloro-1,3-butadiene (chloroprene); 2,3-dichloro-1,3-butadiene; 1,3-pentadiene (piperylene); phenyl diolefins. Partially substituted halogen derivatives may be used, including mixed halogen derivatives such as chloro-fluoro-1,3-butadienes. Other open chain conjugated diolefins which may be dimerized to cycloolefins having at least eight carbon atoms in the ring are useful. An example is 2,4-hexadiene. If desired, peroxides may be removed from the diolefin feed by treatment with ferrous salts, thiosulfates, or sulfites according to available methods.

The catalysts utilizable herein are derivatives of nickel carbonyl bearing, in lieu of one or two of its carbonyl groups, an organo phosphine or an organophosphite. These catalysts are of the type disclosed in Reed United States Patents 2,686,208 and 2,686,209. The preferred catalysts for use in this process have a formula

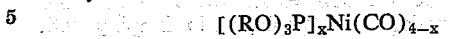

$$[(RO)_3P]_x Ni(CO)_{4-x}$$

where R is an alkyl, aryl, heterocyclic, or other organic radical, and $x$ has a value of one or two, and mixtures thereof. More particularly, it is preferred to use a catalyst having a structure $[(RO)_3P]_2Ni(CO)_2$ where R is phenyl or methyl.

The concentration of catalyst has been conveniently utilized at about 1% of the diolefin charged. However, higher or lower catalyst concentrations are practical; as low as 0.5% catalyst gives excellent results, and about 3% has been used successfully. A range of 0.1–10% by weight is useful.

As is known in the art, it is conventional to use solvents in cycloolefin production from open chain diolefins. Solvents useful in this invention have not been found to be especially critical. Good results are obtained with dicyclopentadiene (dimer of 1,3-cyclopentadiene or 4,7-methylene-2,5-indanediene), alone or mixed with benzene or other solvents such as 1,5-cyclooctadiene. Tetrahydrofuran, toluene, p-cymene, and benzene, alone or in mixture with 1,5-cyclooctadiene, are useful. Others of those suggested herein can be used as the sole solvent. Petroleum ethers, petroleum naphtha, and other hydrocarbon solvents are useful, alone or mixed with other solvents.

The mere conjoint utilization of open chain diolefin, catalyst and solvent as used in the prior art does not give rapid results in cycloolefin production, and may result in undesirably high proportions of by-products. It has now been found that specific catalyst activators are essential for rapid results, and that these activators help in selectively controlling the make-up of the end product. The activators of this invention are isobutylene and diisobutylene.

The proportioning of activator to catalyst may vary widely. A range of 13 to 1 to 2 to 1, and even 1 to 2, on a weight basis of activator to catalyst, is convenient. A 6 to 1 proportion has sometimes been found desirable but higher and lower proportions are entirely practicable within the purview of this invention.

It is sometimes desirable but not essential to use a polymerization inhibitor to prevent the open-chain diolefins from polymerizing into products in addition to cycloolefins. Such inhibitors are recognized in the art and encompass mono- or polynuclear mono- or polyphenols, including phenol, catechol, p-tertiary-butylcatechol, resorcinol, 2,4-dimethyl-6-tertiary butylphenol, tertiary amylphenols, hydroquinones, hydroquinone, quinones, 2,5-ditertiary butyl-1,4-benzoquinone, phloroglucinol, pyrogallol, and naphthols; also amines including N,N'-diisopropyl-p-phenylenediamine, aniline, p-N-diethylaminoaniline, naphthylamines, triethylamine, and phenothiazine; also aromatic polynitro compounds, picric acid, and terpenes. If present or added, an amount of polymerization inhibitor of from 0.01 to 3% by weight of diolefin starting material ordinarily gives satisfactory control of unwanted by-products. Amounts in the neighborhood of 5% or more may be detrimental to the reaction.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

The time of reaction is a function, inter alia, of the temperature but in every case the time is shorter using the activator-catalyst combination with diolefin than is the time required at the same temperature without the activator. For instance, a temperature range of about 90-150° C. has been found to be useful. Both temperature and pressure may vary during the reaction.

Heretofore it was thought that only scrupulously cleaned glass lined reaction vessels were suitable for cycloolefin production. As employed in keeping with the teaching of this invention, glass lined reaction vessels are useful but not essential. Conveniently and with complete success, stainless steel reaction vessel have been found to be practical in this invention, as has carbon steel.

If the reagents are not adequately dry, it is beneficial to pretreat with a dehydrating agent, or to incorporate a dehydrating agent in the reaction mixture. Suitable for this is ethylene oxide, calcium oxide, calcium carbide, and calcium sulfate.

The process may be carried out batch-wise, semicontinuously, or continuously.

The products of reaction have utility as chemical intermediates. Thus, cyclooctadiene is useful in the preparation of cyclooctatetraene, cyclooctane, and cyclooctene, as well as in the preparation of polymers. Even the "by-products" such as vinylcyclohexene may be recovered and utilized, for example, to prepare synthetic resins. Another product, cyclododecatriene may be hydrogenated, to cyclododecane, for example.

It is to be understood that the specific isomers mentioned above or as understood in the art are the ones intended whenever the general name of a group of isomers is used for convenience. Thus, wherever "butadiene" is mentioned, 1,3-butadiene is the isomer referred to, and "cyclopentadiene" is 1,3-cyclopentadiene. Similarly, the cis-cis isomer of 1,5-cyclooctadiene is the geometrical isomer of this invention.

The word "catalyst" is used synonymously with the phrase "reaction initiator" sometimes used in the art, and the phrase "catalyst activators" is used to denote the herein described "activation" compounds even though the exact functions of the compounds have not been completely ascertained.

The following examples are presented for purposes of illustration.

Example 1.—Diisobutylene activator

Into a glass liner of a 710 ml. steel reaction vessel was placed 26 g. of benzene, 0.1 g. of p-t-butylcatechol, 1.0 g. of powdered calcium carbide, 2.0 g. of bistriphenylphosphite nickel dicarbonyl, and 5.0 g. of diisobutylene. The glass liner with its contents was weighed and cooled with powdered solid carbon dioxide. As cooling was started, gaseous butadiene was passed into the mixture in the glass liner until the total liquid occupied approximately 40% of the volume of the liner. Then the liner was weighed to determine the weight of the butadiene added, amounting to 95 g. The liner was placed in the bomb, and heat applied. The reaction was continued for 7 hours after the contents reached a temperature of 100° C. A yield of 75.4% cyclooctadiene was obtained, based on the amount of butadiene consumed, which was 89.2%.

Example 2.—Isobutylene activator

Altering Example 1 by using isobutylene in place of diisobutylene and hydroquinone in place of p-t-butylcatechol, and after reaching reaction temperature, continuing the reaction for 7.5 hours at 118-126° C., gave a 54.2% yield of cyclooctadiene, with 58.8% butadiene consumption.

Example 3.—Other catalysts

In reactions similar to those of Examples 1 and 2 using bistriphenylstilbine nickel dicarbonyl and bistrimethylphosphite nickel dicarbonyl in place of the preferred catalyst, similar results are attained.

Example 4.—Other monomers

Isoprene and chloroprene, used in place of the butadiene of Examples 1 and 2, result in the production of dimethylcyclooctadiene and dichlorocyclooctadiene.

The invention of this application is related to the copending applications of Sekul and Sellers, Serial No. 803,578, filed April 2, 1959, now Patent No. 2,964,575; Sellers and Sekul Serial No. 801,730, filed March 25, 1959; and Bosmajian Serial No. 816,856, filed May 29, 1959.

We claim:

1. In a process for the production of a cycloolefinic compound containing at least eight carbon atoms in the ring by contacting an open chain conjugated diolefin with a nickel carbonyl catalyst in the presence of a solvent and at a temperature between about 90° and about 150° C., the improvement comprising the step of conducting the reaction in the presence of a compound selected from the group consisting of isobutylene and its dimerization product.

2. In a process for the production of a cycloolefinic compound containing at least eight carbon atoms in the ring by contacting an open chain conjugated diolefin with a nickel carbonyl catalyst bearing in lieu of at least one of its carbonyl groups a compound of trivalent phosphorous, in the presence of a solvent and at a temperature between about 90° and 150° C., the improvement comprising the step of introducing into the reaction zone a compound selected from the group consisting of isobutylene and diisobutylene as catalyst activator.

3. In a process for the production of a cycloolefinic compound containing at least eight carbon atoms in the ring by contacting an open chain conjugated diolefin with a nickel carbonyl catalyst in the presence of a solvent and at a temperature between about 90° and about 150° C., the improvement comprising the step of introducing into the reaction zone a compound selected from the group consisting of isobutylene and diisobutylene as catalyst activator.

4. In a process for the roduction of 1,5-cyclooctadiene by contacting butadiene with a nickel carbonyl catalyst in the presence of a solvent and at a temperature between about 90° and about 150° C., the improvement comprising the step of introducing into the reaction zone a compound selected from the group consisting of isobutylene and diisobutylene as catalyst activator.

5. In a process for the production of 1,5-cyclooctadiene by contacting butadiene with bistriphenylphosphite nickel dicarbonyl catalyst in the presence of a solvent and at a temperature between about 90° and about 150° C., the improvement comprising the step of conducting the reaction in the presence of a compound selected from the group consisting of isobutylene and diisobutylene as catalyst activator.

6. In a process for the production of 1,5-cyclooctadiene by contacting butadiene with bistriphenylphosphite nickel dicarbonyl catalyst in the presence of a solvent and at a temperature between about 90° and about 150° C., the improvement comprising the step of introducing into the reaction zone as catalyst activator, the compound isobutylene.

7. In a process for the production of 1,5-cyclooctadiene by contacting butadiene with bistriphenylphosphite nickel dicarbonyl catalyst in the presence of a solvent and at a temperature between about 90° and about 150° C., the improvement comprising the step of introducing into the reaction zone as catalyst activator, the compound diisobutylene.

8. In a process for the production of 1,5-cyclooctadiene by contacting butadiene with a nickel carbonyl organophosphite catalyst in the presence of a solvent and at a temperature between about 90° and about 150° C., the improvement comprising the step of introducing into the reaction zone a catalyst activator comprising diisobutylene.

9. In a process for the production of 1,5-cyclooctadiene by contacting butadiene with a nickel carbonyl organophosphite catalyst in the presence of a solvent and at a temperature between about 90° and about 150° C., the improvement comprising the step of introducing into the reaction zone a catalyst activator comprising isobutylene.

References Cited in the file of this patent
UNITED STATES PATENTS

| | | |
|---|---|---|
| 2,494,510 | Hughes et al. | Jan. 10, 1950 |
| 2,686,209 | Reed | Aug. 10, 1954 |

UNITED STATES PATENT OFFICE

CERTIFICATION OF CORRECTION

Patent No. 2,972,640                                              February 21, 1961

• Robert E. Burks, Jr., et al.

It is hereby certified that error appears in the above numbered patent requiring correction and that the said Letters Patent should read as corrected below.

Column 3, lines 43 and 44, for "Simillarly" read -- Similarly --; column 4, line 7, for "bistriphenylstilbine" read -- bistriphenylstibine --; line 49, for "roduction" read -- production --.

Signed and sealed this 1st day of August 1961.

(SEAL)
Attest:

ERNEST W. SWIDER                                                               DAVID L. LADD
Attesting Officer                                                              Commissioner of Patents